(12) United States Patent
Hosoe

(10) Patent No.: US 7,108,812 B2
(45) Date of Patent: Sep. 19, 2006

(54) FORMING DIE UNIT ADJUSTING METHOD AND FORMING APPARATUS

(75) Inventor: Shigeru Hosoe, Hachioji (JP)

(73) Assignee: Konica Corporation, Tokyo (JP)

( * ) Notice: Subject to any disclaimer, the term of this patent is extended or adjusted under 35 U.S.C. 154(b) by 346 days.

(21) Appl. No.: 10/437,229

(22) Filed: May 14, 2003

(65) Prior Publication Data

US 2003/0214061 A1 Nov. 20, 2003

(30) Foreign Application Priority Data

May 17, 2002 (JP) ............................. 2002-142709
Feb. 14, 2003 (JP) ............................. 2003-036884

(51) Int. Cl.
*B29D 11/00* (2006.01)

(52) U.S. Cl. ..................... 264/2.5; 425/412; 425/808

(58) Field of Classification Search ............... 264/2.5, 264/328.7; 425/150, 412, 808, 577
See application file for complete search history.

(56) References Cited

U.S. PATENT DOCUMENTS

| 5,620,635 A * | 4/1997 | DeRozier et al. ............ 264/2.5 |
| 6,875,384 B1 * | 4/2005 | Whitney .................... 264/40.5 |
| 2001/0053395 A1 * | 12/2001 | Hosoe ........................ 425/408 |

FOREIGN PATENT DOCUMENTS

| JP | 2-107533 | * 4/1990 |
| JP | 8-259245 | * 10/1996 |

* cited by examiner

*Primary Examiner*—Jill L. Heitbrink
(74) *Attorney, Agent, or Firm*—Finnegan, Henderson, Farabow, Garrett & Dunner, L.L.P.

(57) ABSTRACT

A method of adjusting a forming die unit held by a die holding member, comprising steps of discharging a pressure transmitting medium from at least one of the forming die unit and the die holding member to the other one so as to apply a power in a direction that the forming die unit is spaced away from the die holding member; and displacing the forming die unit relatively to the die holding member.

24 Claims, 5 Drawing Sheets

FORMING DIE UNIT ADJUSTING METHOD AND FORMING APPARATUS

BACKGROUND OF THE INVENTION

The present invention relates to a forming die unit adjusting method and a forming apparatus, and in particular, to an adjusting method for a forming die unit which can adjust accurately a forming die unit for forming, for example, an optical element, and to a forming apparatus.

In an forming apparatus that generates a forming such as, for example, a highly accurate optical element through forming, it is extremely important to construct a forming cavity, concerning plural forming dies which mold materials, by combining them accurately without eccentricity. As a method to lower the extent of eccentricity of this forming die, an improvement of accuracy of machining for parts of a die which constitute the forming cavity has been made conventionally, and this method has been attempted to realize highly precise forming for the forming.

However, when improving machining accuracy, it is normally a limit to put a machining error for parts of a forming die within a few microns, and it was a limit to attain parts machining accuracy of about 1 micron even when consuming labor of manual fitting and offering specific technical skill. The reason for this is as follows; when a forming cavity is constructed by incorporating parts of a forming die, a shift (deviation of the direction perpendicular to an optical axis) and a tilt (inclination of an axial line) both corresponding to dispersion of machining accuracy are generated in accuracy of eccentricity of mutual forming dies. In particular, in the case of shift eccentricity, it is possible to improve accuracy up to about 1 micron by consuming time and labor as stated above, but in the case of tilt eccentricity, it was extremely difficult to secure incorporating accuracy of 1 minute angle or less.

In contrast to this, in the following patent document 1, there is disclosed a structure wherein a mount of the upper die is made to be spherical, and a receiving surface of a base is made to be a spherical surface so that the mount may be enchased therein and fixed by bolts through a clamp member. In this technology, the mount can be rotated on the receiving surface, and a tilt of the upper die for the lower die can be adjusted accordingly.

(Document 1)

Tokkaihei No. 8-259245

However, in the conventional technology stated above, when the clamp member that holds the mount is tightened by bolts after adjusting the tilt, the mount is moved by uneven forces of the plural bolts, causing a fear that the tilt angle adjusted with great efforts may be changed.

SUMMARY OF THE INVENTION

The invention has been achieved in view of the problems stated above, and its object is to provide a method of adjusting a forming die unit which can adjust the forming die unit accurately and a forming apparatus.

An embodiment of the invention may include a method of adjusting a forming die unit. The method is represented by a method of adjusting a forming die unit held by a die holding member, having a step wherein the forming die unit is moved against the die holding member when a pressure transmission medium is discharged from at least one party of the die holding member and the forming die unit toward the other party and thereby force is given in the direction to separate the forming die unit from the die holding member (including the state where both parties are still in contact with each other in spite of force against urging force to bring both parties close to each other). In this case, the surface of the other party receiving the discharged pressure transmission medium may be either a single surface or a divided surface. Further, though it is preferable that the forming die unit is held by the die holding member with their partial spherical surfaces being in contact with each other, the surface from which the pressure transmission medium is discharged or the surface on the opposite side may be a plane without being limited to the spherical surface.

DETAILED DESCRIPTION OF THE PREFERRED EMBODIMENT

Figure 1:
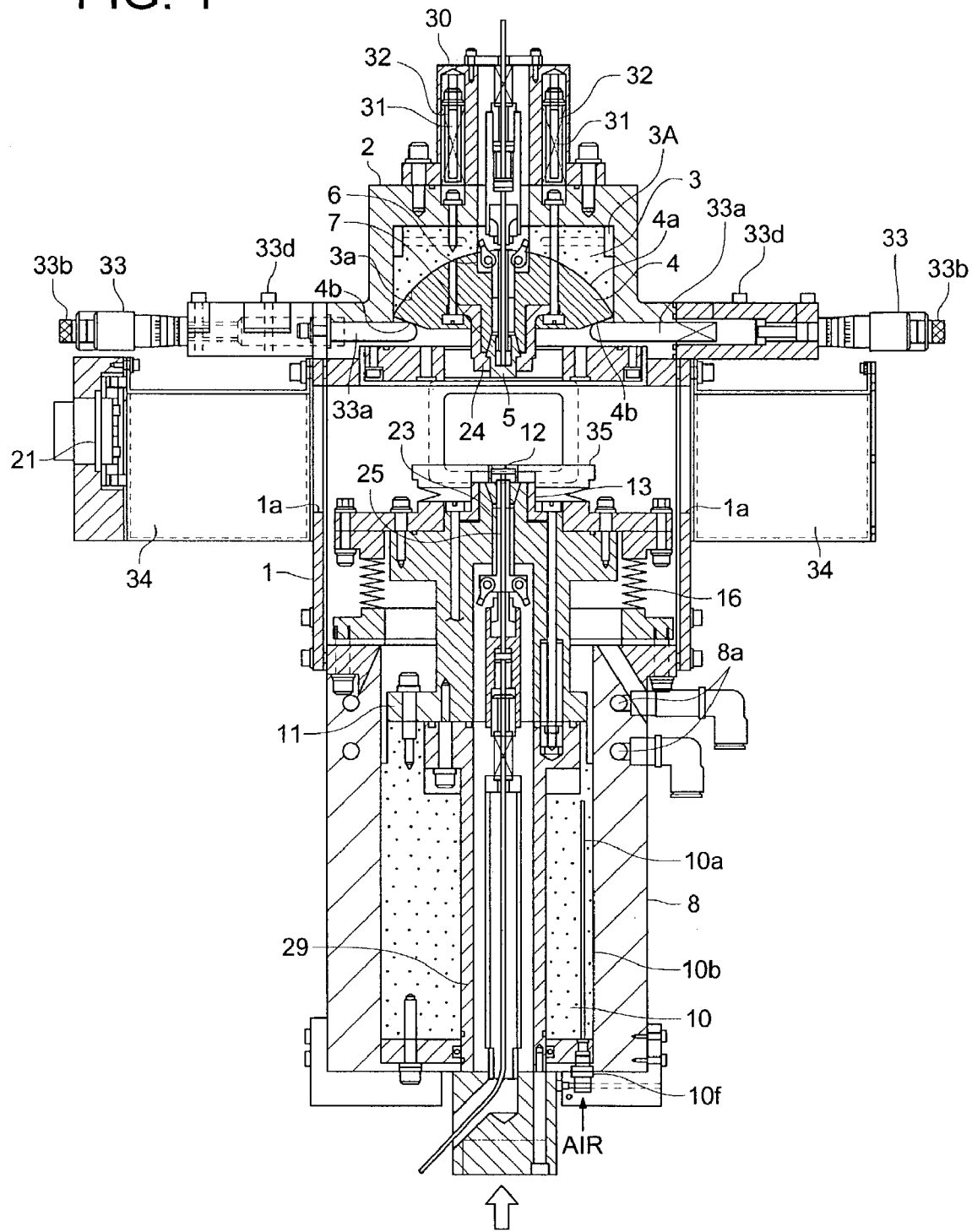
FIG. 1 is a sectional view of a forming apparatus relating to the first embodiment.

Further, hereinafter, the preferred embodiment of the present invention will be described.

An embodiment of the invention may include a method of adjusting a forming die unit. The method is represented by a method of adjusting a forming die unit having a spherical surface portion that is held by the spherical receiving surface of die holding member, having a step wherein the forming die unit is displaced against the die holding member when a pressure transmission medium is discharged from at least one party of the receiving surface and the spherical surface portion toward the other party and thereby force is given in the direction to separate the spherical surface portion from the receiving surface (including the state where both parties are still in contact with each other in spite of force against urging force to bring both parties close to each other). Incidentally, in the "displacement", there are included rotation and shift. Further, the pressure transmission medium means a liquid or gas, and the liquid may be either water or oil and the gas may be either air or argon, and any kinds thereof are workable. Incidentally, in the case of gas, air or nitrogen gas is preferable because it is inexpensive and is handled easily. Further, the surface of the spherical surface portion may be a part of a spherical surface, and a spherical surface portion itself, for example, may be in a shape of a doughnut.

The inventors of the present invention found out the following matters after they studied intensively in view of the problems stated above. Namely, by supporting the forming die unit against the die holding member on a floating basis (showing the state where the forming die unit is slightly moved from the position for its close contact, and it is not always necessary to be separated completely) by using a pressure transmission medium, extremely small (or zero) spherical surface sliding friction force can be realized, and thereby, the forming die unit can be displaced against the die holding member by small force. Thus, it is possible to adjust a tilt for making axial lines for the upper and lower dies, for example, to be agreed with each other, and to realize highly accurate automatic alignment.

The inventors of the invention further found out that it is preferable to satisfy the following conditions for adjusting to control the tilt eccentricity at high precision, and thereby to improve eccentricity accuracy more than automatic alignment by pressing. The conditions are as follows.
(1) An established amount of tilt for the forming die unit is reproduced accurately in the course of forming.
(2) An established of an amount of tilt can be changed accurately.

In short, forming is conducted first with an optional tilt amount, then, a shape of the formed product is measured and a tilt amount existing there is obtained, and if it is possible to establish again accurately the tilt correction amount of the forming die unit necessary for correcting the tilt amount, the tilt amount can be reduced. In short, in other words, (1) if the dispersion error is small sufficiently, with respect to tilt eccentricity in forming, (2) a polarization error can be corrected by the highly accurate adjustment mechanism.

In this method, it is neither necessary to regulate tilt eccentricity to the high accuracy from the beginning of forming, nor necessary to make highly accurate parts of a die by consuming great efforts of labor and offering specific technical skill, and this method has extremely excellent characteristics that a series of processing steps contribute directly to improvement of product quality, because an amount of tilt is obtained directly from a formed product.

The inventors of the invention have achieved the invention by studying intensively how to realize a tilt mechanism that satisfies the (1) and (2) conditions above accurately, from a different point of view, without enhancing simply working accuracy for the forming die unit as in the past, and without regulating the forming die unit with an absolute standard serving as a reference.

In an embodiment of the method of adjusting a forming die unit described herein, the step to displace the forming die unit against the die holding member in the embodiment includes the step to give displacement force to the forming die unit in the area outside a radius of curvature for the curvature center of the receiving surface.

It is naturally possible to give displacement force to the forming die unit, inside the radius of curvature of the receiving surface. However, if the displacement force is given to the forming die unit, outside the radius of curvature for the curvature center of the receiving surface, when adjusting a tilt angle of the forming die unit while moving, for example, an adjustment member, displacement force to be given to the forming die unit can be small, and an amount of movement of an adjustment member corresponding to the tilt angle is enlarged sharply, thus, the tilt angle of the forming die unit can be adjusted easily and accurately. In the invention, friction force between the receiving surface and the spherical surface portion is reduced depending on a pressure transmission medium discharged, together with this simple and sure mechanism, therefore, smooth movement of the forming die unit can be realized. Further, when compared with an occasion to give displacement force to the forming die unit inside the radius of curvature of the receiving surface, an adjustment member is hardly influenced by heat and adjustment can be carried out accurately, because the adjustment member that is given displacement force, for example, is positioned to be away from the forming die unit. Further, even when great pressing force is given in the course of forming, if the adjustment member is positioned outside the radius of curvature of the receiving surface, it is possible to control fluctuation of the tilt by small force corresponding to the foregoing, and thereby, it is possible to hold the forming die unit stably even in the course of forming, and to maintain the same tilt angle.

In the conventional technology, even when an adjustment member, for example, is fed finely, stick-slip is caused because of great friction force between a forming die unit and a die holding member, and the forming die unit does not move, or it suddenly moves greatly, resulting in difficulty of fine adjustment of an angle. The invention reduces friction force between the forming die unit and the die holding member, and makes adjustment easy.

For example, in an optical pickup device representing a next-generation optical information recording and reproducing apparatus, there is required an objective lens having NA 0.85 that is extremely high light-gathering power for which the wavelength of a light source is as short as 405 nm. When generating the objective lens of this kind through press forming by an upper die and a lower die, eccentricity between the right side and the reverse side is caused correspondingly respectively to accuracy errors, and this eccentricity has a great influence on optical functions of the objective lens. For example, if the eccentricity (which is called shift) between the right side and the reverse side of an objective lens is 0.5 µm, there is caused coma of about 15 λrms on the lens. In the same way, if the tilt on a lens is 15 second angle, there is caused coma of about 15 mλrms on the lens. In order to produce, accurately and efficiently, a formed lens that is influenced on an extremely sensitive basis by eccentricity and tilt, it is preferable that the following two conditions are satisfied by a forming apparatus for that lens.
(a) Shift and tilt on an optical transfer surface of a forming die unit in the course of forming can be maintained respectively at the aforementioned values.
(b) Shift and tilt on an optical transfer surface of a forming die unit can be adjusted to be the aforementioned values or less.

The condition in item (a) above is one for realizing precise forming in which the so-called dispersion error is small, and it is preferable, for the tilt to be reproduced repeatedly in the course of forming in particular, that the forming die unit is fixed firmly on a fixing member wherein expansion and contraction are not caused by heat. The condition in item (b) above is one for giving to a forming apparatus the function to correct polarization errors accurately, and it is preferable to adjust to correct tilt and shift on the optical transfer surface of the forming die unit for the converted tilt and shift amount on the optical transfer surface obtained from, for example, evaluation of capacity of a formed optical element.

In particular, it is possible to increase friction force on the receiving surface and thereby to fix the forming die unit firmly, by stopping discharge of a pressure transmission medium in the course of forming. In this case, with respect to pressing force to be applied to a boundary between the receiving surface and the spherical surface portion for preventing fluctuations of a tilt angle caused by pressing force, it is possible to generate it easily through a known method, such as a spring or hydrostatic pressure by a pressure transmission medium.

Incidentally, it is possible to reduce friction force caused on a boundary between the die holding member and the forming die unit by reducing pressing force, even when the die holding member is not separated from the forming die unit completely, although both parties can be separated completely by a pressure transmission medium, thus, it is possible to adjust the microscopic tilt of the forming die unit by making friction force to be smaller than tilt adjusting force. Further, if both parties are not separated completely, it is possible to control fluctuations of a tilt angle generated during separation and fluctuations of a tilt angle generated when both parties are made to be in close contact with each other from their state of perfect separation.

In the invention in this case, the forming die unit may be either a single upper die (or a lower die), or when there is a member (a swinging member described later) which can move solidly together with an upper die (or a lower die) that is fixed on the member, the member may be structured with the upper die (or the lower die) and the member.

In an exemplary method of adjusting a forming die unit described herein, a curvature center of the receiving surface is located on or in the vicinity of the forming surface of the forming die unit, and when forming die unit is displaced from the die holding member to come into contact with the receiving surface, an amount of displacement of the forming surface in the direction perpendicular to the central axis of the forming die unit per 1° of rotation angle of the forming die unit for the die holder member is 100 µm or less.

In particular, in the case of the tilt (angle) adjusting mechanism in the patent document 1, adjustment of the tilt is followed by simultaneous occurrence of a shift, and there has been required angle adjustment which is extremely complicated and is poor in reproducibility and includes readjustment of a shift.

In contrast to this, in the invention, there is provided the die holding member which touches and holds a spherical surface portion of the forming die unit by a receiving surface in a shape of a spherical surface which is preferable if it has a radius of curvature that is almost the same as that of the outer circumferential surface of the aforementioned spherical surface portion. This holding mode is called "spherical surface receiving". In this spherical surface receiving, it is possible to adjust rotation of the forming die unit on the curvature center of the receiving surface, as far as sliding friction is disregarded. In particular, if the curvature center of the receiving surface is located on or in the vicinity of the forming surface of the forming die unit in the structure, when the inclination angle is adjusted by rotating the forming die unit along the spherical surface against the die holding member, the shift eccentricity of the forming surface center following that adjustment is hardly caused (100 µm or less), thus, it is possible to adjust tilt eccentricity accurately, independently of the shift eccentricity. The tilt eccentricity in this case means an inclination angle (an inclination) of the forming surface of the forming die unit for the formed product that is originally present, and it means an amount of eccentricity indicated by rotation on the reference point of the forming surface. For example, when a formed product formed by the forming die unit is an optical element, and when the forming surface includes an optical transfer surface, it is possible to make a reference point on the forming surface to be the center of the optical transfer surface or to be the point on the optical axis.

In any case, tilt eccentricity only does not cause a parallel movement (shift) of the reference point. Further, the shift eccentricity mentioned here means deviation caused by the parallel movement of the reference point, and when a formed product is an optical element in particular, the parallel movement in the direction perpendicular to an optical axis (lateral deviation) is called the shift eccentricity.

An optional eccentricity can be expressed by a combination of tilt eccentricity and shift eccentricity.

As is clear from a definition of the eccentricity, if a forming die unit is arranged so that a curvature center of the receiving surface of the die holding member constituting a spherical surface receiver may agree with or is located to be sufficiently close to a reference point of a forming surface of the forming die unit, even when the forming die unit is made by tilt adjustment mentioned above to slide along the spherical surface receiver, shift eccentricity following the sliding of the forming die unit is hardly caused, or it can be controlled to be extremely small even it is caused.

For example, even when the curvature center of the receiving surface is deviated from the center of the forming surface of the forming die unit by 1 mm, an amount of shift generated by swinging of the optical surface when angle adjustment is conducted by one minute angle is 0.3 µm which is a value to be ignored even in the case of a highly accurate objective lens. Namely, the curvature center has only to be near the center of the forming surface of the forming die unit without being at that center. In the tilt adjustment method of the invention, it is possible to calculate amount of deviation d between the curvature center of a spherical surface receiver and the center of an optical transfer surface from coma on a formed lens by conducting tilt in the prescribed direction for about 3 minutes angle, because tile can be adjusted extremely accurately and with excellent reproducibility. Once this amount of deviation d is calculated, shift amount Δ generated from tilt adjustment angle θ is obtained accurately in advance by the following expression (1), thus, a shift generated simultaneously with tilt adjustment is adjusted, and thereby, highly efficient eccentricity adjustment work for the forming die unit can be realized.

$$d = \Delta / \tan\theta \tag{1}$$

With respect to the shift adjustment for a precision forming die unit satisfying the conditions of (a) and (b) above, it can be realized easily by using technologies disclosed by the inventors of the present invention in TOKKAIHEI No. 2001-341134. As stated above, highly accurate and easy eccentricity adjustment for the forming die unit which was not attained by the conventional technology can be realized by the invention, which makes it possible to manufacture highly accurate formed lenses on a high efficient basis.

In an exemplary method of adjusting a forming die unit described herein, the forming die unit is supported by hydrostatic pressure against the die holding member described herein, thus, the forming die unit can be supported against the die holding member under the condition, for example, of non-contact state, and therefore, force needed for tilt adjustment can be small. Incidentally, even when the forming die unit is not supported against the die holding member on non-contact basis completely, the friction force working between the die holding member and the forming die unit is workable if it is greater than force needed for tilt adjustment.

When a pressure transmission medium is discharged from at least one of the die holding member and the forming die unit toward the other, and when a clearance generated in that case is 100 µm or less, pressing force and pressure of a pressure transmission medium existing in a clearance between the forming die unit and the die holding member are balanced each other, and there is obtained the state wherein the forming die unit floats against the die holding member to stand still and is stabbed. In this case, a flow of a pressure transmission medium in the clearance becomes a laminar flow to generate the state wherein the forming die unit is floated and supported by the hydrostatic pressure against the die holding member. Under this state, pressure for supplying a pressure transmission medium is converted extremely efficiently into force to float and support the forming die unit, thus, a small amount of consumption of the pressure transmission medium is enough, vibration is not caused, and friction is almost zero because of floating, thus, it is easy to conduct microscopic angle adjustment. Therefore, it is possible to realize tilt adjustment of the forming die unit at low cost and accurately.

If the clearance is too large and an amount of floating of the forming die unit is too large, there is a fear that the forming die unit is moved slightly when the forming die unit is rested on the die holding member after tilt angle adjustment, and adjusted tilt angle is changed. Further, there is a possibility that the adjusted tilt angle is changed even when a pressure transmission medium is supplied for floating. Therefore, a smaller clearance is better because an effect for floating in tilt adjustment remains unchanged even when the clearance is as small as 1 μm.

In an exemplary method of adjusting a forming die unit described herein, a solid angle of the receiving surface of the die holding member or the spherical surface portion of the forming die unit is within a range of $\pi/5-3\pi$.

With respect to the spherical surface receiver, it is easy to increase an area to receive the forming die unit or the die holding member, by making the radius of curvature of the receiving surface of the die holding member or by making a solid angle of the receiving surface to be as large as, for example, $\pi/5$, therefore, even when the forming die unit receives injection force or pressing force from a forming material or an opponent part in the course of forming, it is possible to receive it after making surface pressure to be small sufficiently, and therefore, reliability as a mechanical structure can be enhanced. In short, the required conditions of (a) above can be satisfied by the spherical surface receiver under the condition of mechanical contact. Incidentally, if a solid angle of the receiving surface is $3\pi$ or less, the degree of freedom for combination with the forming die unit can be secured.

Further, as required conditions of (b), (i) it is necessary that the spherical surface receiver does not cause backlash and stick-slip in the course of tilt adjustment, and slides extremely smoothly, and (ii) a microscopic angle of rotation adjustment mechanism is necessary, for adjusting tilt eccentricity accurately. The inventors of the invention thought out an idea to make the spherical surface receiver to slide on a non-contact basis by hydrostatic pressure, in order to satisfy the condition of (i). By supplying a pressure transmission medium either from the spherical surface portion of the forming die unit constituting a convex side of the spherical surface receiver, or from the receiving surface of the die holding member constituting a concave side, and by making the pressure transmission medium to be discharged to a space between the spherical surface portion and the receiving surface, it is possible to generate a clearance on the space by hydrostatic pressure of the pressure transmission medium.

In this case, it is preferable that a spring that urges toward the die holding member is provided on the forming die unit, and if the force given by the pressure transmission medium is greater than the urging force of the spring, and if the forming die unit is floated (separated) from the receiving surface, friction is not generated because of non-contact, and tilt adjustment can be conducted by making the forming die unit to rotate easily to be displaced from the die holding member. Incidentally, even when the forming die unit is not separated from the die holding member completely to be kept on the non-contact basis, it is enough if the friction force working between both parties is greater than the tilt adjusting force.

To fix and hold the forming die unit with high rigidity against the pressing force in the course of forming, the greater receiving surface is preferable. If the receiving surface is greater, the pressing force is supported by a greater area, which makes elastic deformation of the receiving surface to be smaller and makes friction force to greater, thus, the forming die unit can be held stably, and highly accurate optical elements can be formed. Further, the force that resists the pressing force in the course of tilt angle adjustment is determined by the product of the pressure for supplying a pressure transmission medium and an area that receives the pressure transmission medium, and therefore, when an area of the receiving surface is great, it is possible to support with less supplying pressure, and deviation of local discharging pressure is averaged by a large area, thus, stable reduction of friction force is attained.

In consideration of the concrete area which is reasonable, the receiving surface cannot be fit in the case of a solid angle where the spherical surface portion side is greater than a sphere, even the maximum solid angle is $4\pi$ or less, and when an optical element is a formed object, a radius of curvature is about 50–100 mm from the size of the formed object. When considering that the curvature center of the spherical surface receiver is positioned at the center of the forming surface such as an optical transfer surface of the forming die unit, it is preferable that the maximum solid angle is about $3\pi$, taking room of the forming die unit into consideration. Further, when considering the minimum angle, under the assumption that the maximum pressing force in the course of forming is 1000 N, when trying to receive that force by the spherical surface receiver with pressure 10 N/cm$^2$, a solid angle of about $\pi/5$ or more is preferable.

In an exemplary method of adjusting a forming die unit described herein, a pressure transmission medium is discharged by the first pressure from at least one of the receiving surface and the spherical surface portion toward the other in the step to give the force in the direction to separate the spherical surface portion from the receiving surface, and a there is a step to change the pressure for the pressure transmission medium discharged from at least one of the receiving surface for the die holding member and the spherical surface portion of the forming die unit.

In an exemplary method of adjusting a forming die unit described herein, the spherical surface portion of the forming die unit is brought into contact with the receiving surface of the die holding member by the step wherein the pressure of a pressure transmission medium is changed to the second pressure.

If the pressure for the pressure transmission medium is changed in a way, for example, to lower it (to the prescribed pressure) after tilt adjustment as stated above, the urging force of the spring, for example, makes the forming die unit to be in close contact with the die holding member automatically to be held. The pressure for supplying a pressure transmission medium for the forming die unit to be floated does not require rigidity and can be relatively low pressure of about 0.1 atm-2 atm, which is different from the occasion of general hydrostatic pressure slider. Further, with respect to the clearance between the spherical surface portion and the receiving surface, the smaller clearance is preferable because a difference of the position of curvature center (=maximum clearance) that is caused when the pressure for the pressure transmission medium is lowered to cause mechanical contact and the forming die unit is brought into contact with die holding member, is small, and fluctuations of tilt eccentricity in the transition period from contact to non-contact are less.

As a clearance between the spherical surface portion and the receiving surface that is necessary for tilt adjustment, a range between the state (generally, about 10–50 nm) wherein floating is almost zero and their surfaces have similar roughness to about 10 µm is ideal. In the aforesaid way, the state wherein non-contact displacement is possible is established, then, an amount of tilt is adjusted by, for example, by the mechanism for adjusting an angle of rotation, and after that, by lowering the pressure for a pressure transmission medium, the forming die unit can be brought into contact with the die holding member.

In an exemplary method of adjusting a forming die unit described herein, it is preferable that the second pressure is a pressure which is not higher than atmospheric pressure. When a spring to urge the forming die unit is provided, the pressure for supplying a pressure transmission medium is lowered down to the point where the pressure cannot resist the urging power of the spring, and the pressure may also be negative pressure for improving adhesiveness between the spherical surface portion and the receiving surface. Namely, after tilt adjustment, the inside of a supply path for a pressure transmission medium is evacuated, then the spring force and the force based on the atmospheric pressure are applied to the space between the spherical surface portion and the receiving surface, thus, it is possible to fix and hold the forming die unit against the die holding member with greater force. Incidentally, the spring for urging the forming die unit is not always required to be in a normal spring shape. A type of the spring is free, and the spring has only to be a member that can urge for forming die unit against the die holding member when no pressure transmission medium is supplied, and allows the forming die unit to be floated from the die holding member to form an appropriate clearance for stable distribution of hydrostatic pressure when a pressure transmission medium is supplied.

Incidentally, under the assumption that a radius of curvature of the receiving surface is made to be 80 mm and a solid angle of the receiving surface is represented by $\pi$, an area of the receiving surface is about 200 $cm^2$, and when the pressure for supplying a pressure transmission medium is made to be 1 atm, and even when an average effective hydrostatic pressure is a half, there is generated floating force of 1000 N. Therefore, even in the case of a member having generally high rigidity by mechanical parts described later, if it a part capable of deforming elastically causing bending in the order of µm against a large floating force coming from a spherical surface receiver, that member can be used as a spring which also has other functions.

In an exemplary method of adjusting a forming die unit described herein, at least a part of the die holding member and the forming die unit is made of a porous material, and a pressure transmission medium is discharged through the porous material.

Although it is possible to uniformalize the hydrostatic pressure on the spherical surface receiver by discharging a pressure transmission medium through a discharging outlet such as an orifice governor formed through machine work, it is also possible to use a porous material for a discharging surface. In this case, a pressure transmission medium is discharged through a microscopic continuous hole that is peculiar to the porous material, which makes it possible to secure hydrostatic pressure that is uniform for the entire surface. This method does not require precision work for surface governors on the spherical surface, and no orifice governor is required, which makes it possible to realize a spherical surface receiver at low cost. There are given ceramic and graphite as a porous material.

In an exemplary method of adjusting a forming die unit described herein, a pressure transmission medium is discharged through surface governors or orifice governors formed on at least one of the die holding member and the forming die unit.

In place of providing a porous material, it is also possible to provide surface governors on the receiving surface of the die holding member constituting a spherical surface receiver so that uniform hydrostatic pressure may by applied on the entire surface, and further to provide orifice governors or capillary tube governors on the discharging outlet for a pressure transmission medium. Owing to these, supporting rigidity can be enhanced because hydrostatic pressure in the clearance between the spherical surface portion and the receiving surface is uniformalized, and the forming die unit can be floated stably because a width of the clearance can be kept at an excellent state of axial symmetry. It is therefore possible to avoid occurrence of tilt caused by floating and non-linear rotary sliding in the course of adjustment of tilt, resulting in enhancement of tilt adjustment accuracy.

In an exemplary method of adjusting a forming die unit described herein, the forming die unit can be attached firmly on the die holding member because the spherical surface portion of the forming die unit is urged against the receiving surface of the die holding member when a pressure transmission medium is discharged from and/or to the surface other than the spherical surface portion of the forming die unit.

In an exemplary method of adjusting a forming die unit described herein, a surface other than the spherical surface portion of the forming die unit and/or a surface facing the aforementioned surface has a plurality of divided surfaces each extending in the different direction, and the forming die unit is displaced against the die holding member by making pressure and/or flow rate of a pressure transmission medium discharged toward each of the plural divided surfaces to be different. Therefore, by making a virtual plane including a plane discharging a pressure transmission medium toward the divided surface, for example, to pass through the center of the radius of curvature of the receiving surface of the die holding member, it is possible to give the force to rotate the forming die unit against the die holding member most efficiently by using the pressure difference and/or flow rate difference of the pressure transmission medium. Incidentally, a pressure transmission medium that displaces the forming die unit against the die holding member may be supplied either from a medium source identical to the pressure transmission medium giving the force in the direction to separate the forming die unit from the die holding member or from another medium source.

In an exemplary method of adjusting a forming die unit described herein, a discharging surface through which the pressure transmission medium is discharged toward the plural divided surfaces is formed by a porous material. It is therefore possible to give the force that is mostly uniform to the entire surface of each divided surface.

However, the structure to rotate the forming die unit against the die holding member may also be one to give the mechanical force directly to the forming die unit, without being the one to use a pressure difference of the pressure transmission medium. An example to rotate the forming die unit by using the pressure difference of pressure transmission medium will be explained later, referring to FIG. 3, and an example to rotate the forming die unit mechanically will be explained later, referring to FIGS. 1 and 2.

In an exemplary method of adjusting a forming die unit described herein, the forming die unit is used for forming an optical element. Therefore, it is preferable because it is possible to form a highly accurate optical element easily by using the adjusted forming die unit.

An exemplary forming apparatus includes a forming die unit equipped with a spherical surface portion, a die holding member equipped with a spherical surface-shaped receiving surface that holds the spherical surface portion of the forming die unit, and a discharging means that discharges from at least one of the receiving surface and the spherical surface portion to the other a pressure transmission medium, and is characterized in that the force is given by the discharged pressure transmission medium in the direction in which the spherical surface portion is separated from the receiving surface (including the state wherein both parties are still in contact each other though the pressure medium is displaying the force opposing the urging force to bring both parties near to each other). Therefore, by supporting the forming die unit against the die holding member by using a pressure transmission medium, extremely small (or zero) spherical surface sliding friction force can be realized, and thereby, the forming die unit can be displaced against the die holding member with light force, thus, it was found that tilt adjustment such as matching axial lines of paired forming die units, for example, can be performed easily, and automatic alignment stated earlier can further be realized.

An exemplary forming apparatus is characterized to have a driven member that moves together with the forming die unit and a granting member that gives to the driven member the displacement force outside the radius of curvature for the curvature center of the receiving surface.

An exemplary forming apparatus is characterized in that the forming die unit has at least one of an upper and lower dies, a reciprocating member having the spherical surface portion, and the driven member, and the driven member is a circular-tube-shaped member engaging in its inside with the die on one side and engaging in its outside with the reciprocating member, and the die on one side and the driven member and/or the driven member and the reciprocating member are in the taper fitting with a taper angle of 600° or less. Therefore, the die on one side can be mounted firmly on the driven member without a play, and/or the driven member can be mounted firmly on the reciprocating member without a play. Incidentally, the driven member may either be extending from the reciprocating member along the axial line of the die on one side (for example, vertical direction), or be extending along the direction crossing the axial line direction of the die on one side (for example, horizontal direction).

An exemplary forming apparatus is characterized in that the granting member is a micrometer. Therefore, highly accurate adjustment can be carried out.

An exemplary forming apparatus is characterized in that transmission of displacement force between the granting member and the driven member is carried out through a parallel elastic spring. Therefore, highly accurate adjustment can be carried out easily, because displacement in one direction is not transmitted to displacement in another direction.

An exemplary forming apparatus is characterized in that the curvature center of the receiving surface is positioned on or in the vicinity of the forming surface of the forming die unit, and when the forming die unit makes a landing on the receiving surface after the forming die unit is displaced against the die holding member, an amount of displacement of the forming surface in the direction perpendicular to the center axis of the forming die unit per one degree of an angle of rotation of the forming die unit against the die holding member becomes 100 µm or less.

An exemplary forming apparatus is characterized in that the forming die unit is supported by hydrostatic pressure against the die holding member.

An exemplary forming apparatus is characterized in that the solid angle of the receiving surface of the die holding member or the spherical surface portion of the forming die unit is not less than.

An exemplary forming apparatus is characterized in that there is provided a pressure adjustment means wherein a pressure transmission medium is discharged at the first pressure from at least one of the receiving surface and the spherical surface portion toward the other, and then, the pressure of a pressure transmission medium discharged from at least one of the receiving surface of the die holding member and the spherical surface portion of the forming die unit is changed to the second pressure.

An exemplary forming apparatus is characterized in that the spherical surface portion of the forming die unit is brought into contact with the receiving surface of the die holding member by changing the pressure of a pressure transmission medium to the second pressure.

An exemplary forming apparatus is characterized in that the second pressure stated above is a pressure that is not higher than the atmospheric pressure.

An exemplary forming apparatus is characterized in that the discharging means has a porous material arranged on at least one side.

An exemplary forming apparatus is characterized in that the discharging means has a surface governor or an orifice governor formed on at least one of the die holding member and the forming die unit.

An exemplary forming apparatus is characterized in that the discharging means discharges a pressure transmission medium from or toward the surface other than the spherical surface portion of the forming die unit, and thereby urges the spherical surface of the forming die unit toward the receiving surface of the die holding member.

An exemplary forming apparatus is characterized in that the method of adjusting a forming die unit is characterized in that a surface other than the spherical surface portion of the forming die unit and/or a surface facing the aforementioned surface has a plurality of divided surfaces each extending in the different direction, and the forming die unit is displaced against the die holding member by making pressure and/or flow rate of a pressure transmission medium discharged toward each of the plural divided surfaces to be different.

An exemplary forming apparatus is characterized in that the discharging surface for the pressure transmission medium discharged toward the plural divided surfaces is formed by a porous material.

An exemplary forming apparatus has therein a forming die unit equipped with a spherical surface portion, a die holding member equipped with a spherical-surface-shaped receiving surface that holds the spherical surface portion of the forming die unit and suction means that sucks in a pressure transmission medium from at least one of the receiving surface and the spherical surface portion of the forming die unit, and is characterized in that the spherical surface portion of the forming die unit is held by the receiving surface of the die holding member by utilizing a difference of pressure from the atmospheric pressure that is generated when the pressure transmission medium is sucked, therefore, it is possible to bring the forming die unit into the die holding member more closely and to control that the axial line of the forming die unit is deviated by great pressing force generated in the course of forming.

An exemplary forming apparatus is characterized in that the suction means has a porous material arranged on at least one side, and therefore, suction force generated between the forming die unit and the die holding member can be maintained to be almost uniform, and deviation of an axial line of the forming die unit in the case of close contact can be controlled.

An exemplary forming apparatus is characterized in that the discharging means has a surface governor or an orifice governor formed on at least one of the die holding member and the forming die unit.

An exemplary forming apparatus has therein a spherical surface portion, a forming die unit equipped with a surface other than the spherical surface portion, a die holding member equipped with a spherical-surface-shaped receiving surface a spherical-surface-shaped receiving surface that holds the spherical surface portion of the forming die unit and a discharge adjustment means capable of discharging pressure transmission media at different pressure from plural positions against the surface other than the spherical surface portion and/or the receiving surface, and is characterized to be capable of displacing the forming die unit against the die holding member by utilizing a pressure difference caused on the surface other than the spherical surface portion and/or the receiving surface by a pressure transmission medium discharged from the discharge adjustment means, thus, it is possible to conduct easily tilt adjustment for the forming die unit, for example, against the die holding member.

An exemplary forming apparatus is characterized in that if the discharge adjustment means has a porous material arranged on the surface other than the spherical surface portion and/or the receiving surface, the pressure generated between the surface other than the spherical surface portion and the receiving surface can be maintained to be uniform.

An exemplary forming apparatus is characterized in that the discharging means has a surface governor or an orifice governor formed on the die holding member and/or the spherical surface portion.

An exemplary forming apparatus has therein a fixed forming die unit equipped with a spherical surface portion, a first die holding member equipped with a spherical-surface-shaped receiving surface that holds the spherical surface portion of the fixed forming die unit, a first discharging means that discharges a pressure transmission medium to a space between the receiving surface of the first die holding member and the spherical surface portion of the fixed forming die unit, a mobile forming die unit that is displaced to touch or to be separated from the fixed forming die unit, a second die holding member that holds (for example, houses) the mobile forming die unit, and a second discharging means that discharges a pressure transmission medium to a space between the second die holding member and the mobile forming die unit, and is characterized in that position adjustment between the first die holding member and the fixed forming die unit can be conducted by giving force in the direction to separate (including the state to be in contact while generating the force capable of opposing urging force) the spherical surface portion from the receiving surface by the pressure transmission medium discharged to a space between the receiving surface and the spherical surface portion, and position adjustment between the second die holding member and the mobile forming die unit can be conducted by discharging the pressure transmission medium discharged to a space between the second die holding member and the mobile forming die unit. Therefore, the fixed forming die unit is suitable for conducting tilt adjustment against the mobile forming die unit because it is used to be fixed in the course of forming, and the mobile forming die unit is suitable for conducting shift adjustment for the fixed forming die unit because the mobile forming die unit is used while it is moved in the course of forming, which makes it possible to form a highly accurate optical element.

An exemplary forming apparatus is characterized in that the first and second discharging means have a porous material, and therefore, pressure of a pressure transmission medium on the discharging surface can be maintained to be uniform, which is preferable.

An exemplary forming apparatus is characterized in that each of the first and second discharging means has a surface governor or an orifice governor formed on the die holding member and/or the spherical surface portion.

An exemplary forming apparatus is characterized in that when the forming die unit is used for forming an optical element, a high-precision forming die unit can be formed easily, which is preferable. Incidentally, as an optical element, there are given, for example, a lens, a prism, a diffraction grating optical element (diffraction lens, diffraction prism and diffraction plate), an optical filter ((spatial low-pass filter, wavelength band-pass filter, wavelength low-pass filter, wavelength high-pass filter etc.), polarizing filter (analyzer, optical rotator, polarization/separation prism), and a phase filter (phase plate and hologram), to which, however, the invention is not limited.

An exemplary forming apparatus is characterized in that plastic material is subjected to injection forming.

An exemplary forming apparatus is characterized in that glass material is subjected to hot press forming.

A forming apparatus relating to the embodiment of the invention will be explained as follows, referring to the drawings. FIG. 1 is a sectional view of the forming apparatus relating to the present embodiment. The forming apparatus of this kind is one applied to the hot press forming mechanism. In FIG. 1, on the upper portion of housing 1, there is arranged and fixed upper die fixing and supporting member 2. Inside the hollow upper die fixing and supporting member 2, there is arranged die holding member (first die holding member) 3 that is made of porous material such as graphite or ceramic. Incidentally, an outer circumference of the upper end of the die holding member 3 is made to be smaller in terms of a diameter, and ring groove space 3A for supplying a pressure transmission medium is formed between the die holding member 3 and the upper die fixing and supporting member 2. The die holding member 3 constitutes a discharging means (first discharging means) and a suction means.

Figure 3:
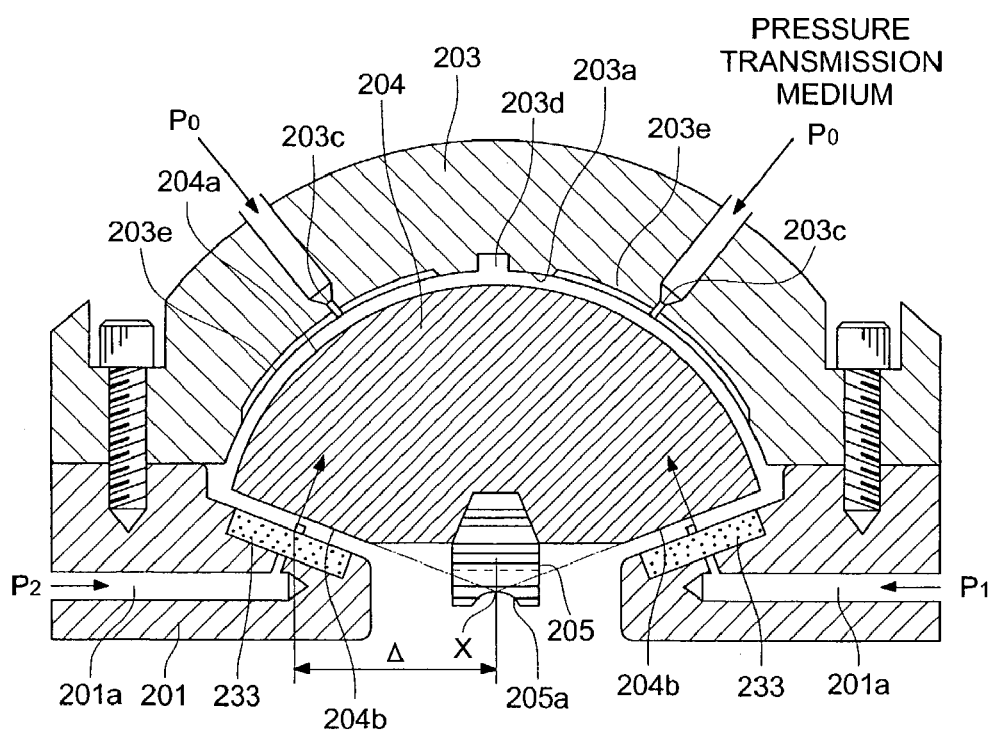
FIG. 3 is a sectional view showing an enlarged periphery of a forming die unit and a die holding member of a forming apparatus relating to the third embodiment.

A bottom surface of the die holding member 3 in FIG. 3 is spherical-surface-shaped receiving surface 3a where there is arranged rocking member 4 in a mushroom shape whose upper portion is spherical surface portion 4b that faces the receiving surface 3a. On the lower end surface of the rocking member 4, there is mounted upper die 5 that constitutes a forming die through taper surface fitting, and it is fixed on the rocking member 4 by upper die holder 24. The rocking member 4 and the upper die 5 constitute the forming die unit (fixed forming die unit). Heater 6 and thermocouple 7 are inserted from the upper portion into the upper die 5. An upper portion of the upper die fixing and supporting member 2 is covered by cover 30. Bolt 31 that fixes upper die holder 24 on the rocking member 4 goes through the rocking member 4 to extend to the cover 30, and its end portion is attached to the upper die fixing and supporting member 2 through spring 32. Therefore, the rocking member 4 is urged upward in FIG. 1 by urging force of the spring 32.

In the vicinity of the outer circumference on the bottom surface of the rocking member, there are formed taper surfaces 4b (FIG. 1 shows only two surfaces) each representing one of four surfaces divided by 90°. Plunger 33a of micrometer 33 arranged on housing 1 is in contact with each taper surface 4b representing a plane surface. As is known well, the micrometer 33 has a function wherein the plunger 33a is advanced or retreated by an amount (shown with an index) according to an amount of rotation, by rotating knob 33b on the end portion.

Housing 1 has a pair of openings 1a opened in the horizontal direction. The openings 1a are connected respectively with conveyance paths 34, and on the end portion of each conveyance path 34, there is provided shutter 21 (one side only is illustrated). Shutter 21 is connected with an unillustrated air cylinder to be moved between open position to be opened and close position to be closed when the air cylinder is driven.

On the lower portion of the housing 1, there is attached square-cylinder-shaped lower die fitting and supporting member 8. Incidentally, inside the lower die fitting and supporting member (second die holding member) 8, there is provided cooling piping 8a through which a coolant passes.

Slider 10 is arranged inside the lower die fitting and supporting member 8. Piston-shaped slider 10 is in a square-pole shape, and it is fitted with an inside of the lower die fitting and supporting member 8, and a clearance between them is about 10 μm. Sleeve 29 is arranged inside the slider 10, lower die fixing and supporting body 11 is mounted on the upper end of the slider 10, and lower die 12 constituting a forming die is attached on the upper portion of the lower die fixing and supporting body 11 by taper surface fitting through lower die holder 13. Heater 23 and thermocouple 25 are inserted in the lower die 12 from the lower portion, and lower die fixing and supporting body 11 is connected with the slider 10 and sleeve 29 to be capable of moving solidly in the vertical direction. Incidentally, lower die 12, lower die fixing and supporting member 11, slider 10 and sleeve 29 constitute a mobile forming die unit, and slider 10 constitutes the second discharging means.

Between the housing 2 and the lower die fixing and supporting member 11, there is arranged metal bellows 16 for separating thermally slider 10 and lower die fitting and supporting member 8 from a forming atmosphere, independently of movement of slider 10, to be capable of expanding and contracting. On the circumference of the lower die 12, there is arranged covering object 35 that keeps a forming atmosphere in the course of forming by moving up and down together with the lower die 12.

The slider 10 is formed by porous material such as ceramic or graphite, and at a position near circumferential surface 10b (representing a discharging surface), there are formed a plurality of blind holes 10a along an entire circumference from the lower portion up to the vicinity of the top end. These blind holes 10a are connected to supply inlet 10f to be connected with a supply source for unillustrated compressed air. Incidentally, a space inside the slider 10 through which the heater 23 and the thermocouple 25 pass is sealed by sleeve 29, and therefore, air representing a pressure transmission medium does not leak to the inner circumferential surface. A lower portion of the cylinder 10 is connected to an illustrated driving source through a load sensor for pressing force detection and a hydrostatic coupling for adjusting axial line deviation (both of them are not shown).

Incidentally, in the present embodiment, air at the normal temperature (air pressure 3 atm) representing a pressure transmission medium is supplied to cylinder 10 from an outer air supply source, to be discharged from blind hole 10a representing a supply path for air through many holes in the direction that is almost perpendicular to the pressing force from the circumferential (side) surface 10b, and thereby, the slider 10 is supported on a non-contact basis against the lower die fitting and supporting member 8. In the course of forming, an air cylinder (not shown) is driven and controlled to open shutter 21, and thereby, a glass or resin optical element which is called a perform and is heated to be softened is conveyed from an outside to a space between upper die 5 and lower die 12 through opening 1a. Further, after the shutter 21 is closed, pressing force is given from the lower portion by an unillustrated driving source, and thereby, slider 10 and the lower die fixing and supporting member 11 are moved upward by prescribed pressing force base on detection by a load sensor, to make the upper die 5 and the lower die 12 to approach each other, and thereby, an optical material is pressed in a forming cavity formed by the upper and lower dies, thus, an optical element in a shape following the die can be obtained. After that, the slider 10 is lowered and the shutter 21 is opened so that the formed optical element may be conveyed out. Though the lower die fitting and supporting member 8, the slider 10 and their fitting surfaces are made to be in a square pole shape, for self-regulation of rotation on a movable axis, in the present example, they may also be in a shape of a cylinder.

In the present embodiment, microscopic holes in a porous material which communicate between a circumferential surface of moving member 10, namely, discharging surface 10b and air supply path 1a serve as an orifice governor to enhance supporting rigidity and to discharge a pressure transmission medium at uniform pressure from the entire discharging surface. Therefore, highly accurate grooves such as a surface governor that serves as a path for feeding air to peripheral portions at high pressure is not necessary, and it is possible to provide the structure that makes it possible to support the slider 10 on the lower die fitting and supporting member 8 accurately, and is at a lower cost.

When there are tilt eccentricity and shift eccentricity between the upper die 5 and the lower die 12, an amount of aberration of coma and astigmatism is increased on the formed optical element, resulting in deterioration of optical characteristics. In the forming apparatus, therefore, it is fundamentally necessary to adjust tilt eccentricity and shift eccentricity on the forming die unit.

How to adjust the forming die unit will be explained as follows. With respect to shift eccentricity (deviation of axial line between the upper die 5 and the lower die 12 in the direction perpendicular to an optical axis), the slider 10 is displaced in the shift direction against the lower die fitting and supporting member 8. To be more concrete, a difference pressure is formed by reducing pressure (or increasing pressure to supply to air supply path 10a of discharging surface 10b on the opposite side) for supply to air supply path 10a in discharging surface 10b of the slider 10 on the side where the deviation of the axial line between the upper die 5 and the lower die 12 is greater, and thereby, the slider 10 is displaced against the lower die fitting and supporting member 8 so that shift eccentricity may be cancelled.

Incidentally, since it is possible to make the lower die 12 to hit the upper die 5 at a constant pressure, by sliding extremely smoothly with slider 10 having a hydrostatic pressure clearance of 10 μm on the lower die fitting and supporting member 8 in size of 120 mm×160 mm supplied with air at 3 atm, it is possible to attain reproducibility of operations with 1 μm or less. Further, it does not happen that eccentricity between the upper die and the lower die is caused newly by these pressing operations. Further, it is possible to conduct shift adjustment with 0.1 μm unit really independently of tilt eccentricity, by providing a difference pressure on the opposing air discharging surface. The contents of this matter will be omitted here, because they are described minutely in TOKUGAN Nos. 2001-341134 and 2002-55241 invented by the inventors of the present invention.

In contrast to this, with respect to tilt eccentricity (inclination of the axial line of upper die 5 for the axial line of lower die 12), tilt adjustment of the forming die unit is carried out by changing an inclination of rocking member 4 for die holding member 3. To be more concrete, if nitrogen gas representing a pressure transmission medium is supplied at a pressure of 2 atm to supply path 3A inside upper die fixing and supporting member 2 from an outer nitrogen gas supply source, the gas is discharged from the bottom surface of die holding member 3 uniformly, and thereby, uniform force is given to spherical surface portion 4a of rocking member 4 (which forms hydrostatic pressure), and the rocking member 4 is displaced (separated) downward against force of spring 32.

Force to displace the rocking member 4 based on the pressure of the nitrogen gas discharged from receiving surface 3a becomes great force because a solid angle of receiving surface 3a and spherical surface portion 4a is as great as π/5–3π in terms of sphere surface area, and even when plunger 33a of micrometer 33 is in contact with surface 4b of the rocking member 4, elastic deformations for both are caused, and thereby, a clearance of a few microns is caused between receiving surface 3a and spherical surface portion 4a, and the rocking member 4 is supported on die holding member 3 on a non-contact basis. Since no friction force is caused between the die holding member 3 and the rocking member 4, either knob 33b of micrometer 33 is turned to contract plunger 33a and to extend plunger 33a on the opposite side, and thereby, pressing pressure of divided surface 4b on one side is lowered and pressing pressure of divided surface 4b on the other side is increased, thus, the rocking member 4 is easily rotated and displaced against the die holding member 3, and tilt adjustment is conducted easily. Incidentally, locking screw 33d is used to fix the plunger 33a after it is moved forward or backward.

By changing the air pressure in supply path 3A inside upper die fixing and supporting member 2 from positive pressure (first pressure) to negative pressure (second pressure lower than atmospheric pressure) after tilt adjustment, gas in a clearance with spherical surface portion 4a of rocking member 4 is sucked from receiving surface 3a of die holding member 3, and thereby, it is possible to hold spherical surface portion 4a on receiving surface 3a on a close contact basis by utilizing pressure difference from atmospheric pressure.

In the press forming apparatus having the structure wherein a tilt adjustment mechanism is provided on the fixed side (upper die) and shift adjustment mechanism is provided on the slide movable side (lower die) as stated above, a perform made of optical resin material is subjected to press forming, then, wavefront aberration of the formed lens is classified by an interferometer to obtain coma and astigmatism, and eccentricity adjustment was conducted for the upper and lower dies twice by obtaining an amount of eccentricity of an optical surface corresponding to its aberration difference by optical design, thus, the following results were obtained.

| WFErms | Tertiary spherical aberration | Tertiary coma | Tertiary astigmatism | Residual component |
|---|---|---|---|---|
| Beginning | 45 mλ | 50 mλ | 32 mλ | 18 mλ |
| After adjustment of eccentricity | 32 mλ | 3 mλ | 8 mλ | 10 mλ |

In consideration of above results, a few of the wavefront aberration in the beginning were higher-order aberration component (residual component) and most of the wavefront aberration in the beginning were tertiary aberration component. Therefore, an amount of tilt and an amount of shift of the optical surface of the corresponding die were adjusted to achieve correction which is relatively close to linear one, and it was possible to reduce coma and astigmatism of the formed lens to the ultimate by adjusting eccentricity twice for the upper and lower dies. Incidentally, spherical aberration also seems to be reduced apparently, because spherical aberration component is also affected in classification of aberration when coma and astigmatism are great. To improve further, it is necessary to change forming conditions, a die shape and an interval of optical surfaces, because the improvement has no connection with tilt eccentricity and shift eccentricity of upper and lower dies. In this case, measurement wavelength λ is 655 nm.

From the results of experiments, aberrations of the formed lens were classified into dispersion errors and eccentricity errors by forming, and forming conditions were established so that dispersion errors may be less as far as possible, then, regarding the eccentricity errors, spherical aberration was reduced by adjustment of an interval of optical surfaces, and coma and astigmatism were reduced by eccentricity adjustment for tilt and shift of the forming die unit to make the tertiary aberration component to be almost zero, thus, a yield for forming which had been 86% was improved to 95%.

Figure 2:
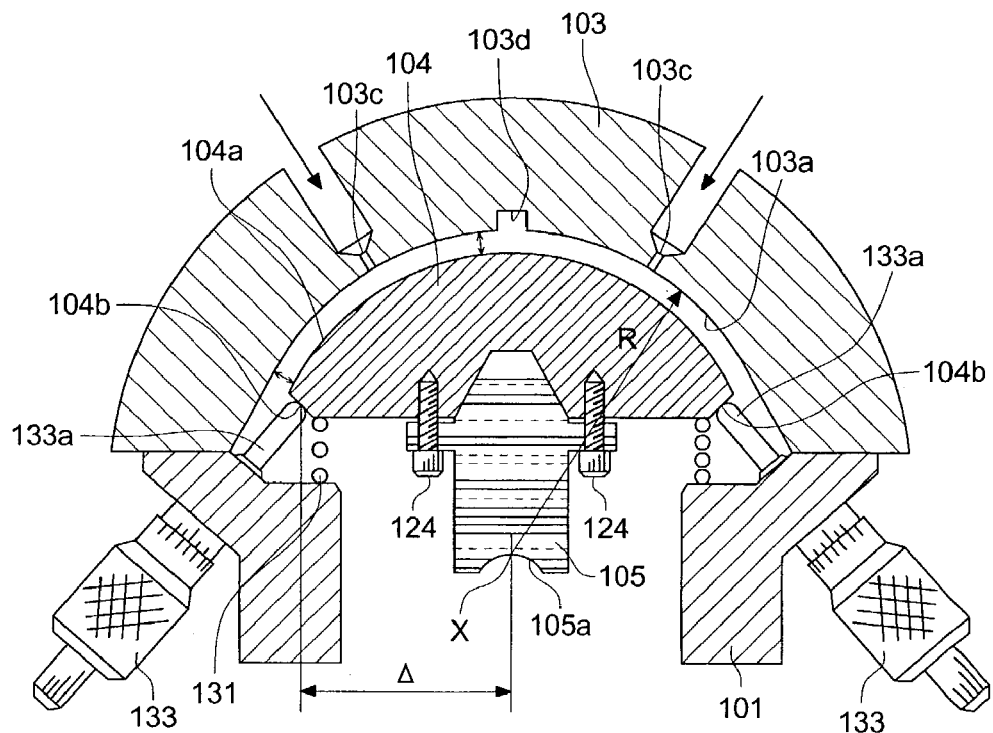
FIG. 2 is a sectional view showing the enlarged periphery of a forming die unit and a die holding member of a forming apparatus relating to the second embodiment.

FIG. 2 is a sectional view showing the enlarged periphery of a forming die unit and a die holding member of a forming apparatus relating to the second embodiment. The second embodiment has basically the same functions as in the embodiment stated above, and different points will be explained as follows accordingly.

In the present embodiment, die holding member 103 is not made of porous material, and four orifice governors 103c (only two of them are shown in FIG. 2) arranged to have an interval of 90° are formed to be opened to receiving surface 103a. The orifice governors 103c are connected to an outer nitrogen gas supply source. Incidentally, on the receiving surface 13a of the die holding member 103, there is formed circular groove 103d so that it passes through an intermediate point of the facing orifice governor 103c. The circular groove 103d serves as a portion through which the nitrogen gas discharged from the orifice governor 103c escapes.

Upper die 105 is attached to the bottom surface of rocking member 4 through bolt 124, and the rocking member 4 is urged upward against housing 101 by spring 131. Further, plungers 133a of four micrometers 133 are respectively in contact with four taper surfaces 104b of rocking member 104.

In FIG. 2, it is preferable that curvature center X of receiving surface 103a of die holding member 103 is positioned on or in the vicinity of forming surface 105a of upper die 105 that constitutes a forming die unit, and when rocking member 104 comes into contact with receiving surface 103a after being displaced against die holding member 103, an amount of displacement of forming surface 105a in the direction perpendicular to the central axis of upper die 105 is 100 µm or less per 1° of an angle of rotation of the upper die 105 against the die holding member 103.

In embodiments shown respectively in FIG. 1 and FIG. 2, micrometers 33 and 133 are provided respectively as mechanical rotation-displacing mechanisms each rotation-displacing each of rocking members 4 and 104 constituting forming die units, against each of die holding members 3 and 103.

On the other hand, in the mechanical adjustment mechanism of this kind, there is a fear that plungers 33a and 133a are expanded easily by heat generated in the course of forming, in the order of µm, and a clearance is formed between each of plungers 33a and 133a and each of rocking members 4 and 104, or excessive rotation force is generated. It is therefore necessary to control heat expansion strictly for conducting adjustment accurately. Namely, for giving reproducibility to an established amount of tilt, it is necessary to plan to use, for example, a material of low linear expansion such as invar steel for plungers 33a and 133a. Though the mechanical tilt adjustment is simple in principle, it is necessary to solve various problems for practical application on a forming apparatus.

In contrast to this, the inventors of the invention were struck with an idea to conduct microscopic rotation mechanism with a differential motion on a hydrostatic pressure basis, in place of a mechanical method. The structure of this kind will be explained. FIG. 3 is a sectional view showing an enlarged periphery of a forming die unit and a die holding member of a forming apparatus relating to the third embodiment. The third embodiment also has basically the same functions as in the embodiment stated above, and different points will be explained as follows accordingly.

Also, in the present embodiment, die holding member 203 is not made of porous material, and four orifice governors 203c (only two of them are shown in FIG. 2) arranged to have an interval of 90° are formed to be opened to receiving surface 203a. Incidentally, on the receiving surface 203a, there is formed shallow-groove-shaped surface governor 203e that extends lengthwise and breadthwise along a circumferential surface from orifice governor 203c, which contributes to uniform pressure distribution between spherical surface portion 204a of rocking member 204 and receiving surface 203a. Incidentally, the die holding member 203 may also be formed with porous material in place of providing orifice governor 203c.

Four taper surfaces 204b are formed at an interval of 90° on the bottom surface of rocking member 204 constituting a forming die unit, and on housing 201, there are stuck and fixed four porous pads 233 to face the taper surfaces 204b. On the back of the porous pads 233 formed with porous material, there is supplied nitrogen gas from an outer nitrogen gas supply source through supply path 201a in housing 201. Incidentally, it is preferable that pressure $P_0$ of nitrogen gas supplied to supply path 201a can be adjusted separately from pressure $P_1$ and pressure $P_2$ of nitrogen gas supplied to orifice governor 203c of die holding member 203. Porous pad 233 constitutes a means to adjust discharging.

When nitrogen gas representing a pressure transmission medium is supplied to orifice governor 203c from an outer nitrogen gas supply source in the case of tilt adjustment, uniform force is given to spherical surface portion 4a of rocking member 4 by a function of surface governor 203e (thereby hydrostatic pressure is formed), and thereby, taper surface 204b can displace (separate) rocking member 204 downward, by overcoming the force based on pressure of nitrogen gas discharged from the facing surface of porous pad 233.

Under the aforesaid condition, in FIG. 3, nitrogen gas representing a pressure transmission medium is supplied to orifice governor 203c from an outer nitrogen gas supply source at pressure of $P_0$, then, a hydrostatic pressure clearance is created between receiving surface 203a and spherical surface portion 204a by overcoming pressure of nitrogen gas discharged from the discharging surface of porous pad 233, and rocking member 204 constituting a forming die unit is separated from die holding member 203 to create the state where displacement can be conducted on a non-contact basis. In this case, a hydrostatic pressure clearance is kept even between taper surface 204a and a discharging surface of porous pad 233 to maintain a non-contact condition, thereby, rocking member 204 is in a floating condition wherein it does not touch anything.

Now, discharging surfaces of two porous pads 233 arranged on an axis symmetry basis are looked. Under the assumption that nitrogen gas is supplied at pressure $P_1$ to porous pad 233 on the right side in FIG. 3, and nitrogen gas is supplied at pressure $P_2$ to porous pad 233 on the left side, when $P_1=P_2$ holds, force of rotation on curvature center X does not work on rocking member 204 for die holding member 203, and tilt eccentricity adjustment is not conducted. However, when $P_1>P_2$ is made to hold by adjustment of an unillustrated regulator, a differential pressure is generated, and thereby, force received by taper surface 204b on the right side becomes greater than that received by taper surface 204b on the left side, and the rocking member 204 receives the force to rotate it on curvature center X counterclockwise. When the rocking member 204 is rotated by prescribed angle, the hydrostatic pressure clearance on the right side (clearance between taper surface 204b and a discharging surface of porous pad 233) is broadened, thereby hydrostatic pressure in the clearance is lowered, while, hydrostatic pressure clearance on the left side becomes narrow, and thereby, hydrostatic pressure in the clearance is enhanced, thus, the force to rotate is eliminated and rotation is stopped. Since it is known that a change of hydrostatic pressure caused on a hydrostatic pressure surface by a change of differential pressure is almost proportional to supplied pressure, while, a change of hydrostatic pressure caused on a hydrostatic pressure surface by a clearance change is in inverse proportion to the third power of an amount of clearance, it is possible to control a microscopic change of an amount of hydrostatic pressure clearance, in other words, an angle of rotation, namely, an amount of tilt, for a change of great supply pressure.

After adjustment of an tilt amount, if supply of nitrogen gas to orifice governor 203c is stopped, rocking member 204 touches die holding member 203 in the aforesaid state, and is held to be in contact. Further, in the present embodiment, taper surface 204b representing the surface other than spherical surface portion 204a on rocking member 204 is inclined so that a resultant force of pressure of nitrogen gas discharged from porous pad 233 may press spherical surface portion 204a against receiving surface 203a, it is possible to make rocking member 204 to be held in close contact with die holding member 103 with only the force based on pressure of nitrogen gas discharged from porous pad 233, thus, it is possible to make a spring supporting the rocking member to be unnecessary as in the embodiment stated above. Incidentally, in this case, the relation of $P_1=P_2$ may be employed.

However, when pressure of nitrogen gas discharged from porous pad 233 is low, it is possible to obtain great pressing force by atmospheric pressure by conducting vacuum suction by making the inside of orifice governor 203c to be of negative pressure. If the maximum hydrostatic pressure clearance between taper surface 204b and a discharging surface of porous pad 233 is 30 μm or less, the clearance hydrostatic pressure can be maintained stably, which is preferable. However, a range of adjustment of hydrostatic pressure clearance in this method is about ±15 μm because the minimum clearance causes the contact state. Namely, under the assumption that distance Δ between the middle point of porous pad 233 in the direction of a radius of a forming die unit and curvature center X of receiving surface 204a is 50 mm, ±60 seconds angle is an range of tilt adjustment. Since this almost agrees with tilt marginal value 1 minute based on machining accuracy for mechanical parts as stated above, its residual tilt eccentricity can be corrected extremely accurately, because residual tilt eccentricity amount is in this adjustment range after each part is made accurately.

In the aforesaid tilt adjustment method, mechanical adjustment is not needed at all, and it is possible to adjust a tilt amount of the forming surface simply and accurately only by inserting a regulator in the supply path for, example, a pressure transmission medium, this tilt adjustment method is superior to the mechanical tilt adjustment mechanism in terms of cost, easy operation, reliability and certainty.

Incidentally, taper surface 204b and a discharging surface of porous pad 233 may be either a plane or a conical surface. When each of these is a plane, its axis symmetry arrangement forms a multi-sided pyramid, and it also serves as a stopper for rotation of rocking member 204 for die holding member 203. Further, in the case of conical surface, taper surface 204b and a discharging surface of porous pad 233 can be created easily by turning work of a lathe, which is a merit. A leak of a pressure transmission medium from a surface other than a discharging surface of porous pad 233 can be prevented by soaking the medium with epoxy resin type coating or adhesive agent and by solidifying them.

Further, the structure for discharging nitrogen gas to taper surface 204b does not always require porous material, and a discharging outlet of an orifice governor or of a capillary tube governor may be combined with a surface governor. A characteristic of the invention is to conduct adjustment by using hydrostatic pressure without depending on a concrete mode. Further, a pressure transmission medium may also be discharged naturally from a forming die unit or from a rocking member side, without being limited to a housing.

By using a forming apparatus relating to the embodiment shown in FIG. 3, nitrogen gas at 1.5 atm was supplied to orifice governor in a die holding member having a receiving surface whose radius of curvature is 80 mm, and 3 atm was supplied independently to the back side of porous pad (porosity 16%, thickness 5 mm) wherein a discharging surface divided into four on an axis symmetry basis is a plane. In this case, a hydrostatic pressure clearance (clearance between a receiving surface and a spherical surface) is 5 μm, and a hydrostatic pressure clearance in axis symmetry arrangement (clearance between a taper surface and a discharging surface) was about 10 μm for four surfaces. Among discharging surfaces of four porous pads, supply pressure for nitrogen gas on one side in two surfaces facing each other is made to be 3.2 atm by a regulator and that on the other side was made to be 2.8 atm to establish a differential pressure of 0.4 atm. In this case, a change of inclination angle of a die holding portion was measured by an autocollimator, and it was stabilized with an inclination of 15 seconds angle. As a differential pressure resolution, it was found out that an inclination angle can be adjusted to about 2 seconds angle corresponding to ⅛ of a scale of a pressure gauge, because resolution of a scale of the large-sized pressure gauge attached on the regulator was 0.05 atm.

Figure 4:
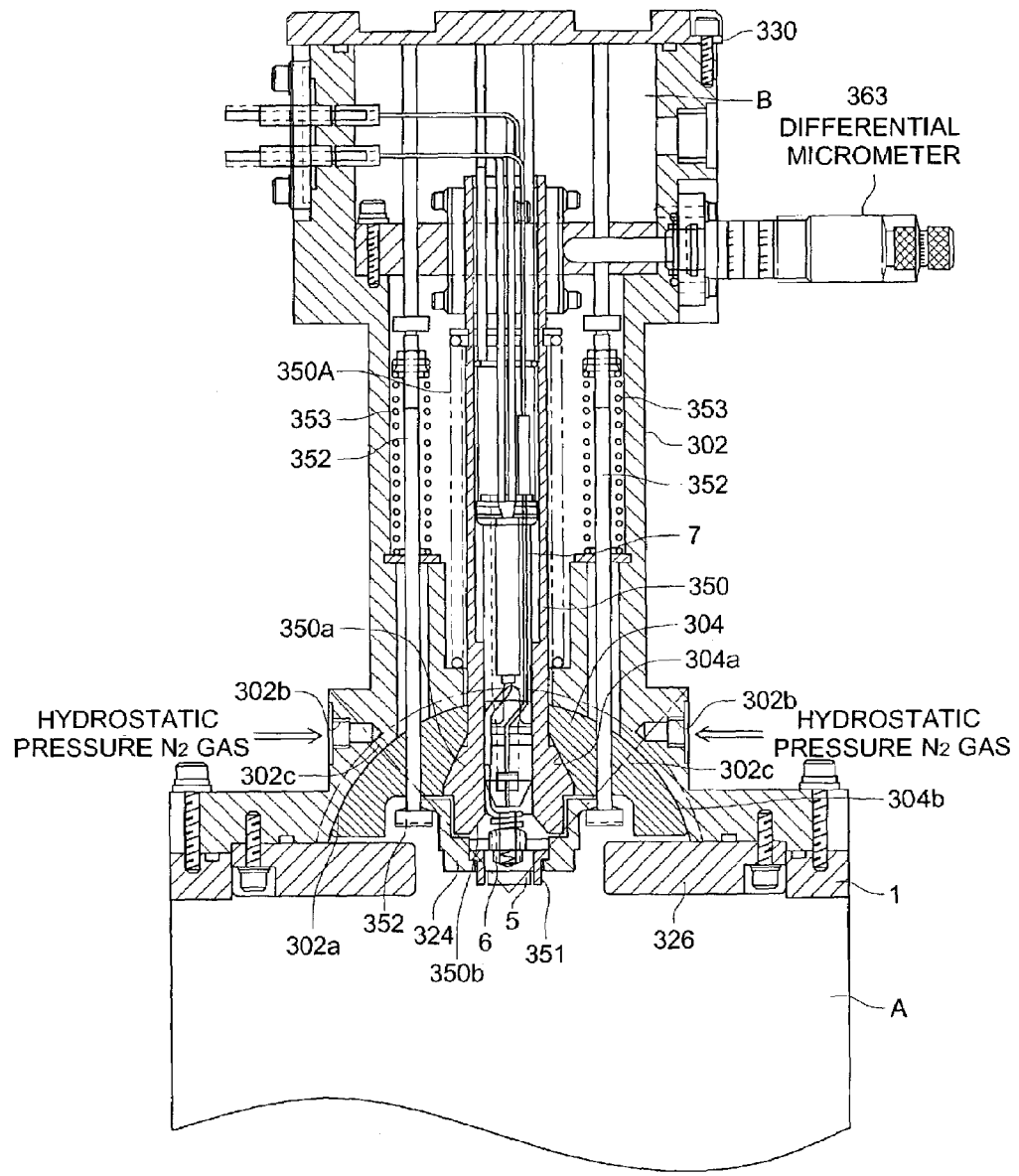
FIG. 4 is a partial sectional view of a forming apparatus relating to the fourth embodiment.

FIG. 4 is a partial sectional view of a forming apparatus relating to another embodiment. The structure shown in FIG. 4 can be replaced with an upper die portion in the forming apparatus shown in FIG. 1. Therefore, an explanation of the structure on the side of a lower die will be omitted. In FIG. 4, upper die fixing and supporting member 302 that is almost in a cylinder shape is arranged to be fixed on a top plate of a forming chamber of housing 1. Upper die fixing and supporting member 302 representing a die holding member has on its bottom end spherical-surface-shaped receiving surface 302a. In the present embodiment, the upper die fixing and supporting member 302 which also serves as a die holding member has supply inlet 302b connected with an unillustrated connector on an outer circumference in the vicinity of a bottom end. Between the supply inlet 302b and the receiving surface 302a, there is formed orifice governor 302c that represents a discharging means and is in a shape of a capillary tube.

In a way to face receiving surface 302a of the upper die fixing and supporting member 302, there is installed hemisphere-shaped rocking member 304 whose top surface is spherical surface portion 304b. At the center of the rocking member 304, there is formed opening 304a whose lower end portion is tapered, in a vertical direction in the drawing. Through the inside of the opening 304a, there is provided cylinder-shaped arm 350 representing a driven member. The arm 350 has, on its outer circumferential surface at the lower end, outer taper surface 350a having a taper angle of 40°. By making the outer taper surface 350a to engage with a taper portion of opening 204a, the lower end of the arm 350 is connected firmly with rocking member 304. Though the arm 350 may be formed to be solidly with rocking member 304, it is preferable that the arm is processed as a separate object to be combined with the rocking member, for grinding accurately an outer circumferential surface of the rocking member.

Further, the arm 350 has, on its inner circumference at the lower portion, inner taper surface 350b having a taper angle of 40°. Upper die 5 that constitutes a forming cavity is engaged with inner taper surface 350b, on a taper surface fitting basis. It is preferable that a radius of curvature center of spherical surface portion 304b of the rocking member 304 agrees mostly with an optical axis position of a forming surface of the engaged upper die 5. The arm 350 is urged upward by coil spring 350A arranged on the outer circumference of the arm, and thereby, separation of the are from the rocking member 304 is prevented.

The upper die 5 is fixed on the rocking member 304, through upper die supporter 324 and stopper ring 351, by four (only two pins are shown in the drawing) holding pins 352 extending through upper die fixing and supporting member 302. The holding pins 352 is urged upward by coil spring 353 against the upper die fixing and supporting member 302, and owing to this urging force, the upper die 5 is supported against the rocking member 304 and the rocking member 304 is supported against the upper die fixing and supporting member 302. Strength of this urging force can be changed by adjusting an amount of compression of the coil spring 353. In the present embodiment, the rocking member 304 and the upper die 5 constitute a forming die unit (fixed forming die unit).

Heater 6 and thermocouple 7 are inserted from the upper portion into the arm 350 to reach the upper die 5. The lower portion of the upper die fixing and supporting member 302 is forming chamber A, while, adjusting chamber B is provided at the upper portion of the upper die fixing and supporting member 302. A top of the adjusting chamber B is covered by cover 330. Heat insulating material 236 such as alumina or silicon nitride is arranged between the forming chamber A and the rocking member 304.

Figure 5:
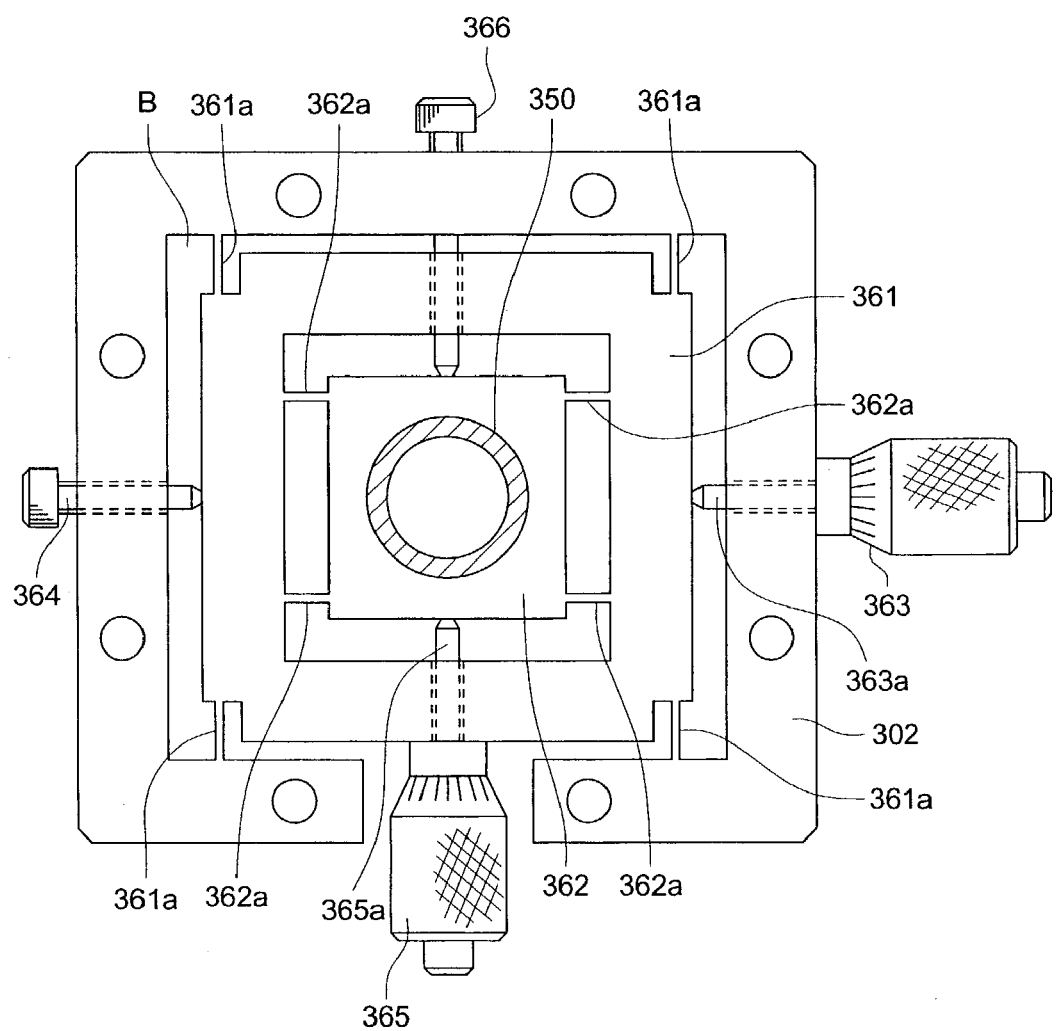
FIG. 5 is a diagram of the adjusting chamber B that is viewed from the upper portion by removing cover 330 in FIG. 4.

FIG. 5 is a diagram of the adjusting chamber B that is viewed from the upper portion by removing cover 330 in FIG. 4. In FIG. 5, simplified structure is shown for easy understanding. Inside the upper die fixing and supporting member 302 which is preferably formed by stainless steel or Inconel in FIG. 5, there is arranged square-frame-shaped X-direction transmission member 361, and inside thereof, there is arranged Y-direction transmission member 362 which is equally square-plate-shaped. The Y-direction transmission member 362 is arranged to be engaged with the arm 350 to move solidly. The upper die fixing and supporting member 302 and X-direction transmission member 361 are connected to each other through four thin plates portion 361a which are arranged to be in parallel each other. Further, the X-direction transmission member 361 and Y-direction transmission member 362 are connected to each other through four thin plates portion 362a which are arranged to be in parallel each other in the direction perpendicular to the plate portion 361a. Incidentally, the upper die fixing and supporting member 302, X-direction transmission member 361, plates portion 361a, Y-direction transmission member 362, plates portion 362a (all of these form a parallel elastic spring) can be formed solidly by processing such as wire cut.

X-direction micrometer 363 representing a granting member attached on the upper die fixing and supporting member 302 makes a tip of plunger 363a that moves in the direction perpendicular to the plate portion 361a to be in contact with the side of X-direction transmission member 361. Further, a tip of lock bolt 364 attached on the upper die fixing and supporting member 302 is in contact with X-direction transmission member 361 on the side opposite to the contact portion of plunger 363a. On the other hand, Y-direction micrometer 365 representing a granting member attached on the X-direction transmission member 361 makes a tip of plunger 365a that moves in the direction perpendicular to plate portion 362a to be in contact with the side of the Y-direction transmission member 362. Lock bolt 366 attached on the upper die fixing and supporting member 302 passes through the position where it does not touch the X-direction transmission member 361, and a tip thereof is in contact with the Y-direction transmission member 362 on the side opposite to the contact portion of plunger 365a. Incidentally, as stated above, each of micrometers 363 and 365 has a function to advance or withdraw each of plungers 363a and 365a by an amount (shown by an index) corresponding to an amount of rotation when a knob on the end portion is rotated. As is apparent from FIG. 4, each of plungers 363a and 365a is arranged to be capable of granting displacement force to the arm 350 outside spherical surface portion 304b of rocking member 304. Plate portions 361a and 362a constitute a parallel elastic spring.

A tilt angle adjusting method in the present embodiment will be explained. An optical element is formed actually in the present forming apparatus, and tilt angles for both optical surfaces in X direction and Y direction are obtained, by measuring optical characteristics. Next, in FIG. 4, nitrogen gas (for example, 0.5 atm) representing a pressure transmission medium is supplied through supply inlet 302b of the upper die fixing and supporting member 302, through an unillustrated piping. Supplied nitrogen gas is discharged from receiving surface 302a toward spherical surface portion 304b of rocking member 304 through orifice governor 302c, and nitrogen gas in this case generates high hydrostatic pressure stably owing to a governing effect of orifice governor 302c, and thereby, generates force (force in the direction to separate spherical surface portion 304b from receiving surface 302a) resisting urging force of coil spring 353, and reduces friction force between both parties.

Incidentally, by making supply pressure of nitrogen gas, for example, to be greater than urging force of coil spring 353, sticking force between receiving surface 302a and spherical surface portion 304b can be made small, resulting in sharp reduction of friction force between both parties, and under certain circumstances, friction force can be made almost zero by generating a clearance of several microns between both parties.

Under the condition that friction force between receiving surface 302a and spherical surface portion 304b is reduced or is made to be zero, the rocking member 302 is rocked against the receiving surface 302a so that the tilt angle obtained as mentioned above may be made zero. To be more concrete, when plunger 363a of X-direction micrometer 363 is fed finely in FIG. 5 under the state where lock bolts 363 and 366 are loosened sufficiently, plate portion 361a is deformed elastically, and therefore, X-direction transmission member 361 moves finely in the X direction against the upper die fixing and supporting member 302. When the X-direction transmission member 361 moves finely, Y-direction transmission member 362 moves by the same amount through plate portion 362a that is rigid in the X direction. Due to this, it is possible to rock the arm 350 and rocking member 304 by an amount equal to that for fine feeding for plunger 363a, and in this case, there is no movement in Y direction, and shift (deviation between centers of upper and lower dies) is not caused for the reason stated above. In the same way, when plunger 365a of Y-direction micrometer 365 is fed finely, plate portion 362a deforms elastically in Y direction, and therefore, Y-direction transmission member 362 moves finely in Y direction, but, X-direction transmission member 361 is not displaced against the upper die fixing and supporting member 302 because plate portion 361a is rigid in Y direction. In addition, shift (deviation between centers of upper and lower dies) is not caused for the reason mentioned above. From the foregoing, it is possible to move the arm 350 and the rocking member 304 independently in X direction and Y direction according to an amount of fine feeding for plungers 363a and 365a, thus, it is possible to conduct tilt angle adjustment accurately.

Incidentally, the parallel elastic spring stated above is provided also on Z axis that is the direction of an axial line of the arm 350, in addition to XY direction on a horizontal plane, and it absorbs a difference of temperature-caused expansion caused by a difference of thermal expansions between arm 350 made of silicon nitride and an upper die fixing and supporting member made of metal, so that unguarded force may not be applied on the arm 350 even under the high temperature condition in the course of forming.

In the present embodiment, receiving surface 302a can be made of a rigid material such as metal by the use of orifice governor 302c, thus, even when large force in the axial line direction is applied on upper die 5 in the course of press forming, there is hardly caused an elastic deformation, and it is possible to defend against pressing force. Further, the receiving surface 302a can be made to be a part of the upper die fixing and supporting member 302, which is extremely advantageous on the points of manufacturing cost and delivery time. When receiving surface 302b is made of metal material,-there is a fear that heat of upper die 5 and forming chamber A is easily transmitted, resulting in an increase of power consumption of a heater and decline of accuracy of temperature control. In the present embodiment, however, arm 350 and rocking member 304 are made of silicon nitride so that sufficient resistance for heat and oxidation may be exhibited even when a temperature of upper die 5 is raised to 600° by heater 6, and high insulation is realized so that heat of the upper die 5 may hardly be transmitted to the rocking member 304. Further, forming chamber A was covered by heat insulating material 326 such as one made of alumina to control transmission of heat so that heat may not be transmitted to the outside easily, and the receiving surface 302a was made of metal. Owing to this, processing of the receiving surface 302a turned out to be simple and easy so that an ordinary lathe can be used, which is extremely advantageous on the points of manufacturing cost and delivery time. However, the receiving surface 302a may also be formed by a porous part, separately from the upper die fixing and supporting member 302.

Figure 6:
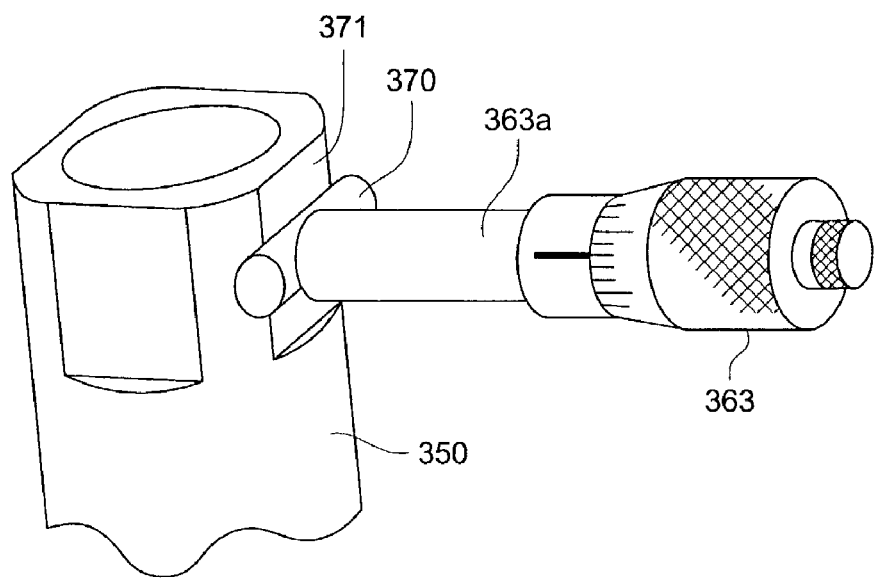
FIG. 6 is a partial sectional view of a forming apparatus relating to the fifth embodiment.

FIG. 6 shows the fifth embodiment in which, with respect to the mechanism to conduct microscopic feeding for the arm extending from the spherical surface receiver, another example that does not use an elastic spring shown in FIG. 5. In FIG. 6, the micrometer 363 is fixed on a casing in the same way as in FIG. 4, and a roller 370 is interposed between an end face of a micrometer head 363a and an arm 350. This structure is repeated for four divisions each forming an angle of 90°, which is not illustrated, and an arrangement wherein micrometers face each other for the arm restrains, with its pressing force only, the tilt retention of the arm and rotation on the central axis. The roller interposed between the end face of a micrometer head and a plane surface 371 provided on the arm is supported by unillustrated holding parts so that the roller may not fall, and therefore, even when parallelism between the end face of the micrometer head representing the pressing portion and the plane surface of the arm is lost, the end face and the plane surface are prevented from hitting each other on the point because the roller is imposed, and both of them come in close contact with each other on the line, thus, high holding rigidity can be secured. Though it is possible to prevent that holding rigidity of the arm becomes contact on a point that is extremely small, by making the elastic spring and the end face of the micrometer head to be a spherical surface, it is impossible to make holding rigidity to be large for the direction of rotation on the central axis of the arm. However, in the present example, line contact can be maintained constantly for the arm, a micrometer and the roller, and for the roller and the plane surface of the arm. Therefore, it is possible to regulate to keep high rigidity even for rotation on the central axis of the arm. Further, since there is no flexible structure at all on a fine adjustment portion for tilt, it is possible to enhance holding rigidity for tilt more than the occasion of FIG. 4. Namely, the present embodiment can reconcile that fine adjustment can be done for tilt of a die holding member and that when the die holding member is fixed, its tilt is not changed easily.

Figure 7:
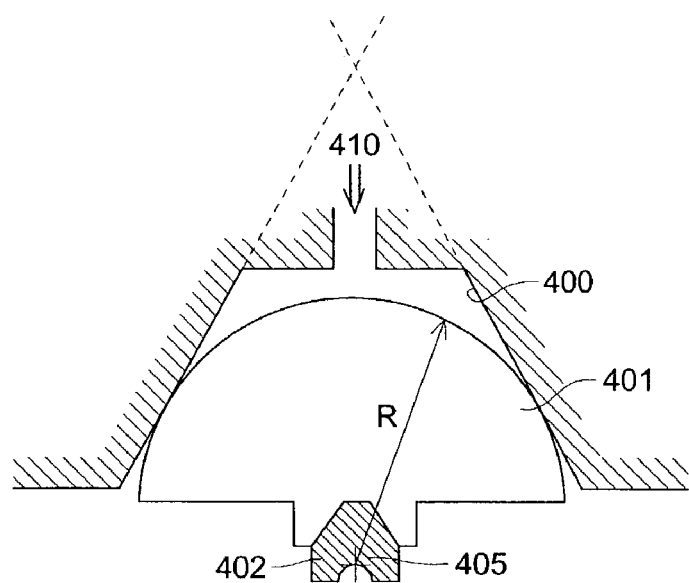
FIG. 7 is a partial sectional view of a forming apparatus relating to the sixth embodiment.

FIG. 7 shows the sixth embodiment in which a receiving surface does not always need to be a spherical surface. If the sphere center 405 of a die holding member is positioned at the center of a forming surface (for example, when the forming surface is an optical surface, a point on the optical axis), its receiving surface may also be a conical surface 400. Since the conical surface 400 and a spherical surface 401 are in contact with each other on a circle, the pressing force applied on a die 402 in the course of forming is transmitted to a receiving surface by this contact circle to be accepted, thus, an effect of the invention can be realized by the structure which is extremely simple and by accuracy of parts. However, an area of the receiving surface of this contact circle portion is much smaller in comparison with an occasion of spherical surface receiving. Therefore, pressing force turns out to be large pressure and it is applied on the contact circle portion, therefore, elastic deformation and plastic deformation are easily generated on the conical surface and the spherical surface of this portion. Therefore, this is not so suitable for the application where strictness is required for the position of the forming die in the direction of pressing pressure.

When a pressure transmission medium 410 is discharged in a space between the conical surface and the spherical surface, hydrostatic pressure works in the direction to separate, resisting the spring force to press an unillustrated die holding member against the conical surface, thus, the spherical surface of the die holding member can be separated from the conical surface. Due to this, it is possible to generate the state where friction hardly exists between both parties, thus, microscopic tilt amount can be adjusted extremely smoothly if the tilt of the die holding member is adjusted by the mechanism for microscopic feeding of the micrometer described above. By lowering the pressure of a pressure transmission medium existing between the conical surface and the spherical surface receiver after completion of tilt adjustment of the forming die, both parties are brought into contact with each other by the spring force, and the die holding member is fixed. As stated above, the present example realizes a highly accurate tilt adjusting mechanism, with an extremely simple and easy structure.

EXAMPLE 1

As an example using a forming apparatus shown in FIGS. 4 and 5, an arrangement was made so that microscopic displacement may be carried out by micrometers 363 and 365 having reading resolution of 1 µm, at the location where the arm 350 is away from the curvature center of spherical surface portion 304b of rocking member 304, namely from the center (optical axis) of a forming transfer surface of upper die 5. This distance represents a value by which the arm 350 is tilted by 1 second angle on a center represented by the middle of the forming transfer surface of the upper die 5 when the micrometer is fed by 1 µm. Therefore, an amount of feeding in a unit of micron for each of micrometers 363 and 365 is an angle in second for tilt adjustment of the upper die, as it is.

Though nitrogen gas was used as a pressure transmission medium in this case, rocking member 304 was lifted by 5 µm (moved downward in FIG. 5) when pressure of 0.5 atm was applied because an area of the receiving surface was as large as about 140 cm$^2$, and tilt adjustment was made extremely smoothly by micrometers 363 and 365. When an actual tilt angle was measured by an auto-collimator, an error was only 10% of the reading of each of micrometers 363 and 365 within an adjustment range of 1 minute angle or less. This means that even when tilted at 10 seconds angle with only the readings of micrometers 363 and 365, measurement can follow with and error of 1 second angle or less, and it was confirmed that tilt adjustment can be conducted easily and in extremely high accuracy.

Further, when supply of nitrogen gas was stopped, the rocking member 304 which had been lifted was brought into contact with the receiving surface 302a, and in this case, an amount of tilt varied by about 2 seconds angle. In contrast to this, when pressure for supplying nitrogen gas wad made to be 0.05 atm, the rocking member 304 was not lifted and was in contact with the receiving surface 302a. Despite this condition, friction force between both parties was reduced, and when tilt angle adjustment was conducted by micrometers 363 and 365, it was confirmed that the actual tilt angle agreed with the readings of micrometers 363 and 365 with an error of about 15% for a range of adjustment of 1 minute angle or less, although slight stick-slip exists. In this case, even when supply of nitrogen gas was stopped, a tilt angle of arm 350 was not changed. From the foregoing, it was found that extremely accurate tilt angle adjustment for a forming die unit can be realized easily, and tilt adjustment can be carried out with sufficient room even in the case of a forming die unit that forms an objective lens for a next-generation optical disk stated above, in the present example.

EXAMPLE 2

In this example, as same as in Example 1, the forming apparatus shown in FIGS. 4 and 5 are used.

Under the condition wherein micrometers 363 and 365 were attached on upper die fixing and supporting member 302, the pressure for supplying nitrogen gas was made to be 0.05 atm, and rocking member 304 and receiving surface 302b were in contact with each other, an actual amount of tilt was compared with the readings of micrometers 363 and 365 by the use of an auto-collimator, as in Example 1.

As a result, it was possible to conduct tilt angle adjustment on almost linear basis with an error of 10% or less, up to ±1.25 mm corresponding to a full stroke of micrometers 363 and 365. This corresponds to ±20 minutes angle in terms of an angle. Therefore, it was found that tilt angle adjustment can be carried out accurately on a basis of an angle that is as small as a few seconds angle, and yet, a range is as broad as almost 1000 times a few seconds angle, in the present example.

Though the invention has been explained above, referring to the embodiments, the invention should not be construed to be limited to the aforementioned embodiments, and it can naturally be modified and improved properly. For example, a pressure transmission medium may also be discharged from the forming die unit side toward a die holding member, or, a pressure transmission medium may be discharged from the lower die fitting and supporting member side toward a slider.

The invention makes it possible to provide a forming die unit adjusting method and a forming apparatus wherein the cost is low and yet, a forming die unit can be adjusted highly accurately.

What is claimed is:

1. A method of adjusting a forming die unit having a spherical section held by a die holding member having a spherical receiving surface and wherein a curvature center of the spherical receiving surface is located on or in the vicinity of a forming surface of the forming die unit, a driven member extending to outside of the spherical receiving surface and moving together with the forming die unit and having a plane surface on an outer circumferential surface thereof, an apply member applying a displacing force to the driven member, and a roller disposed between the driven member and the apply member, the roller being rotatable around a central axis thereof, comprising steps of:

discharging a pressure transmitting medium from at least one of the forming die unit and the die holding member to the other one so as to apply a power in a direction that the forming die unit is spaced away from the die holding member; and adjusting the forming die unit relative to the die holding member by applying the displacing force on contact with on a line of the roller to the driven member at an outside of a radius of curvature in relation to the curvature center of the spherical receiving surface by the apply member, wherein when the forming die unit is located on the receiving surface after the forming die unit is displaced relative to the die holding member, a displacement perpendicular to the central axis of the forming die unit per 1° of an angle of rotation of the forming die unit relative to the die holding member is 100 μm or less.

2. The method of claim 1, wherein the forming die unit is supported with a static pressure for the die holding member.

3. The method of claim 1, wherein a solid angle of one of the receiving surface of the die holding member and the spherical section of the forming die unit is π/5 to 3π.

4. The method of claim 1, wherein the step of applying power in a direction that the spherical section is spaced away from the receiving surface discharges the pressure transmitting medium with a first pressure from at least one of the receiving surface and the spherical section to the other one, and thereafter the step of discharging comprises a step of changing the pressure of the pressure transmitting medium discharged from at least one of the receiving surface and the spherical section to a second pressure.

5. The method of claim 4, wherein by the step of changing the pressure of the pressure transmitting medium discharged to the second pressure, the spherical section of the forming die unit is brought in contact with the receiving surface of the die holding member.

6. The method of claim 4, wherein the second pressure is not higher than the atmospheric pressure.

7. The method of claim 1, wherein at least a part of the die holding member and the forming die unit is made of a porous material and the pressure transmitting medium is discharged through the porous material.

8. The method of claim 1, wherein the pressure transmitting medium is discharged through a surface throttle or a orifice throttle formed on at least one of the die holding member and the forming die unit.

9. The method of claim 1, wherein by discharging the pressure transmitting medium from the other surface of the spherical section of the forming die unit or to the surface, the spherical section of the forming die unit is urged toward the receiving surface of the die holding member.

10. The method of claim 9, wherein the other surface of the spherical section of the forming die unit and/or an opposite surface to the surface comprises plural divided surfaces extending in respective different direction, and by making a pressure and/or a flow rate of the pressure transmitting medium discharged toward at least one of the plural divided surfaces to be different from that toward the others, the forming die unit is displaced relatively to the die holding member.

11. The method of claim 10, wherein the surface to discharge the pressure transmitting medium toward the plural divided surfaces is made of a porous material.

12. The method of claim 1, wherein the forming die unit is used to form an optical element.

13. A forming apparatus, comprising:
a forming die unit having a spherical section;
a die holding member having a spherical receiving surface to hold the spherical section of the forming die unit and wherein a curvature center of the spherical receiving surface is located on or in the vicinity of a forming surface of the forming die unit;
a discharging member to discharge a pressure transmitting medium from at least one of the receiving surface and the spherical section to the other one so as to apply a power in a direction that the spherical section is spaced away from the receiving surface,
a driven member extending outside of the spherical receiving surface and moving together with the forming die unit;
an apply member applying a displacing force to the driven member at outside of a radius of curvature in relation to the curvature center of the spherical receiving surface;
a roller disposed between the driven member and the apply member, with the roller being rotatable around a central axis thereof;
wherein the driven member has a plane surface on an outer circumferential surface thereof and wherein the roller and the plane surface of the driven member contact each other on a line.

14. The forming apparatus of claim 13, wherein the forming die unit comprises one die of an upper die and a lower die, a rocking member having the spherical section and the driven member, and wherein the driven member is a cylindrical member in which the one die is engaged in an inside of the cylindrical member and the rocking member is engaged in an outside of the cylindrical member and the engagement between the one die and the inside of the cylindrical member and the engagement between the rocking member and the outside of the cylindrical member is a taper engagement with a taper angle of 60° or less.

15. The forming apparatus of claim 13, wherein the forming die unit is supported with a static pressure for the die holding member.

16. The forming apparatus of claim 13, wherein a solid angle of one of the receiving surface of the die holding member and the spherical section of the forming die unit is $\pi/5$ to $3\pi$.

17. The forming apparatus of claim 13, further comprising: a pressure regulating member to discharge the pressure transmitting medium with a first pressure from at least one of the receiving surface and the spherical section to the other one and thereafter to change the pressure of the pressure transmitting medium discharged from at least one of the receiving surface and the spherical section to a second pressure.

18. The forming apparatus of claim 17 wherein by changing the pressure of the pressure transmitting medium discharged to the second pressure, the spherical section of the forming die unit is brought in contact with the receiving surface of the die holding member.

19. The forming apparatus of claim 18, wherein the second pressure is not higher than the atmospheric pressure.

20. The forming apparatus of claim 13, wherein the discharging member includes a porous material provided on at least one of the die holding member and the forming die unit.

21. The forming apparatus of claim 13, wherein the discharging member includes a surface throttle or an orifice throttle formed on at least one of the die holding member and the forming die unit.

22. The forming apparatus of claim 13, wherein the discharging member discharges the pressure transmitting medium from the other surface of the spherical section of the forming die unit or to the surface in such a way that the spherical section of the forming die unit is urged toward the receiving surface of the die holding member.

23. The forming apparatus of claim 22, wherein the other surface of the spherical section of the forming die unit and/or a opposite surface to the surface comprises plural divided surfaces extending in respective different direction, and by making a pressure and/or a flow rate of the pressure transmitting medium discharged toward at least one of the plural divided surfaces to be different from that toward the others, the forming die unit is displaced relatively to the die holding member.

24. The forming apparatus of claim 23, wherein the surface to discharge the pressure transmitting medium toward e plural divided surfaces is made of a porous material.

* * * * *